Jan. 18, 1955 G. L. TUCKER 2,700,147

SPIN ECHO INFORMATION STORAGE

Filed Oct. 7, 1953 5 Sheets-Sheet 1

INVENTOR
GARDINER L. TUCKER
BY Van Deventer & Shively
ATTORNEYS

Jan. 18, 1955 G. L. TUCKER 2,700,147

SPIN ECHO INFORMATION STORAGE

Filed Oct. 7, 1953 5 Sheets-Sheet 2

INVENTOR
GARDINER L. TUCKER

BY Van Deventer & Shirely,
ATTORNEYS

INVENTOR
GARDINER L. TUCKER
BY
Van Deventer & Shirely
ATTORNEYS

INVENTOR
GARDINER L. TUCKER
BY
Van Deventer & Shively,
ATTORNEYS

INVENTOR
GARDINER L. TUCKER
BY
Van Deventer & Shively,
ATTORNEYS

United States Patent Office 2,700,147
Patented Jan. 18, 1955

2,700,147

SPIN ECHO INFORMATION STORAGE

Gardiner L. Tucker, New York, N. Y., assignor to International Business Machines Corporation, a corporation of New York Application October 7, 1953, Serial No. 384,741
16 Claims. (Cl. 340—173)

The present invention pertains to improvements in spin-echo techniques and apparatus.

Spin echo technique, also known as the method of free nuclear induction, is based primarily on utilizing the relationship between the characteristic phase orientations of nuclear magnetic moments within a substance for deriving a useful result.

Specifically, it has previously been discovered that by subjecting globules of various chemical substances to certain combinations of exteriorly established magnetic influences, the phase inter-relationship of the nuclear magnetic moments may be controlled first to store information, and subsequently to re-deliver it.

In a typical procedure, the chemical substance is placed in a strong inhomogeneous magnetic field. A radio-frequency (R. F.) type coil is positioned in the magnetic field so as to encircle the substance, the coil being orientated to direct its axis at right angles to the direction of the magnetic field. Information is stored in the substance by applying a series of R. F. impulses to the R. F. coil, setting up additional magnetic influences which disturb the prior relationship of the nuclear magnetic moments in a manner hereinafter set forth in explanatory detail.

In order to read out the stored information a single R. F. pulse, called the recollection pulse, is applied to the coil at a time $T_a$ after the last information pulse. At a time after the termination of the recollection pulse equal in duration to $T_a$, an echo signal, representing the last information pulse applied, is induced in the R. F. coil. Similar echo signals are successively induced in the R. F. coil corresponding to the remaining information pulses. In the originally derived application of the technique, information pulses are stored in the chemical substance in the order 1, 2, 3, 4, etc., and are subsequently read out in the order 4, 3, 2, 1.

One of the greatest practical fields of usefulness of the Spin Echo technique lies in its precision application at high speed, involving informational impulses of very short duration, for example of the order of one microsecond or less. However, it has been determined by extensive experiment that for such operation by the technique as disclosed prior to the present invention, such huge amounts of R. F. power are required as to remove the operation from the field of useful general practice.

A prime object of the present invention is to eliminate the above limitation, that is to provide certain improvements in apparatus and procedure whereby multiple pulses of short duration can be accurately stored in and extracted from liquid, solid or gaseous substances through the use of moderate amounts of R. F. power.

A related specific object is to provide a method of the above nature involving variation of the primary magnetic field to permit entry of information pulses and echo production under conditions of wide local field strength differences but to provide a greatly reduced local field difference range during the intermediate recollection pulse, whereby the latter pulse may be of relatively greater duration and smaller amplitude, while maintaining maximum resolutional correspondence between the echo pulses and their corresponding information pulses.

In explaining the present invention and its relation to the prior state of the art, reference will be made to the accompanying drawings, in which Figure 1 is a diagrammatic illustration of a typical combination of permanent magnet, D. C. coils and R. F. coils for applying information pulses to a sample and for setting up the corresponding inductive read-out pulses;

Figure 5:
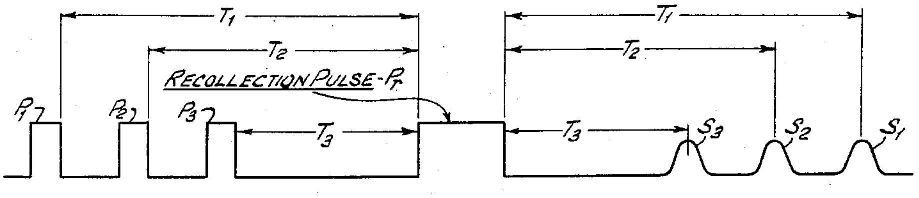
Figure 4A:
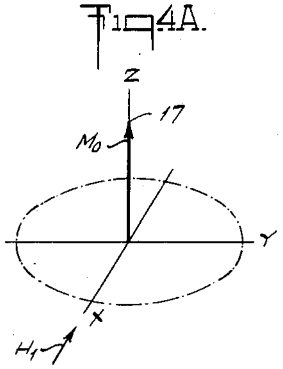
Figure 4B:
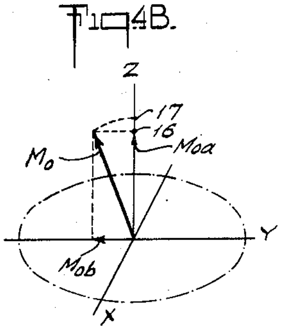
Figure 4C:
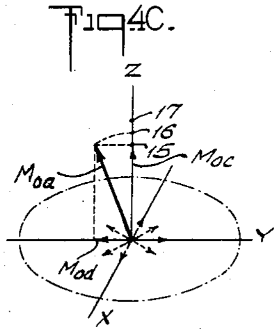
Figure 6A:
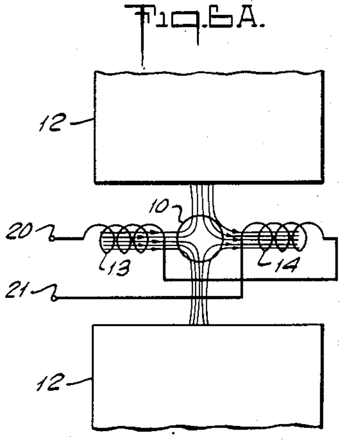
Figure 6B:
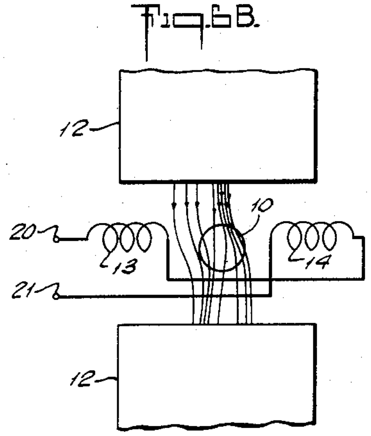
Figure 7:
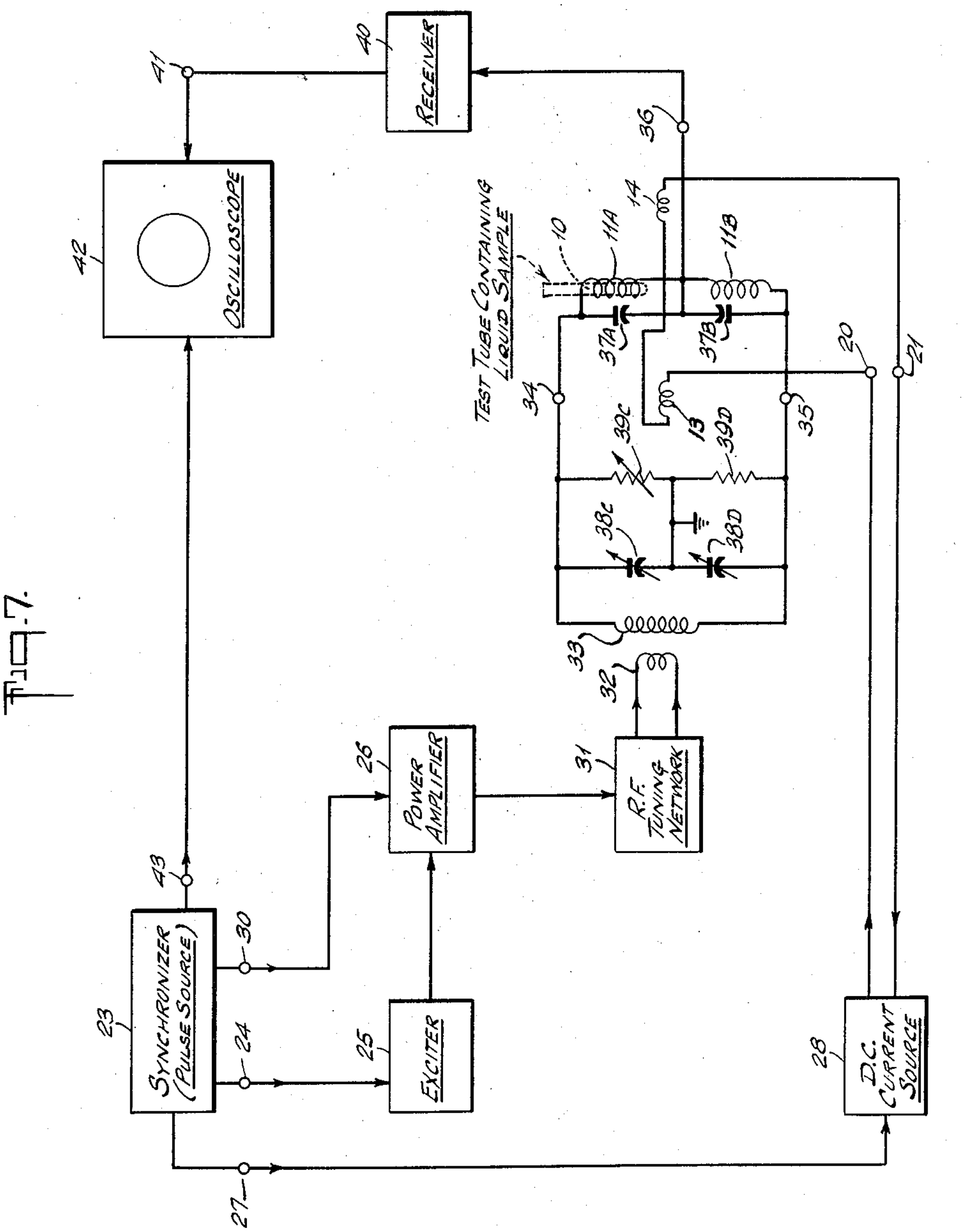
Figure 8:
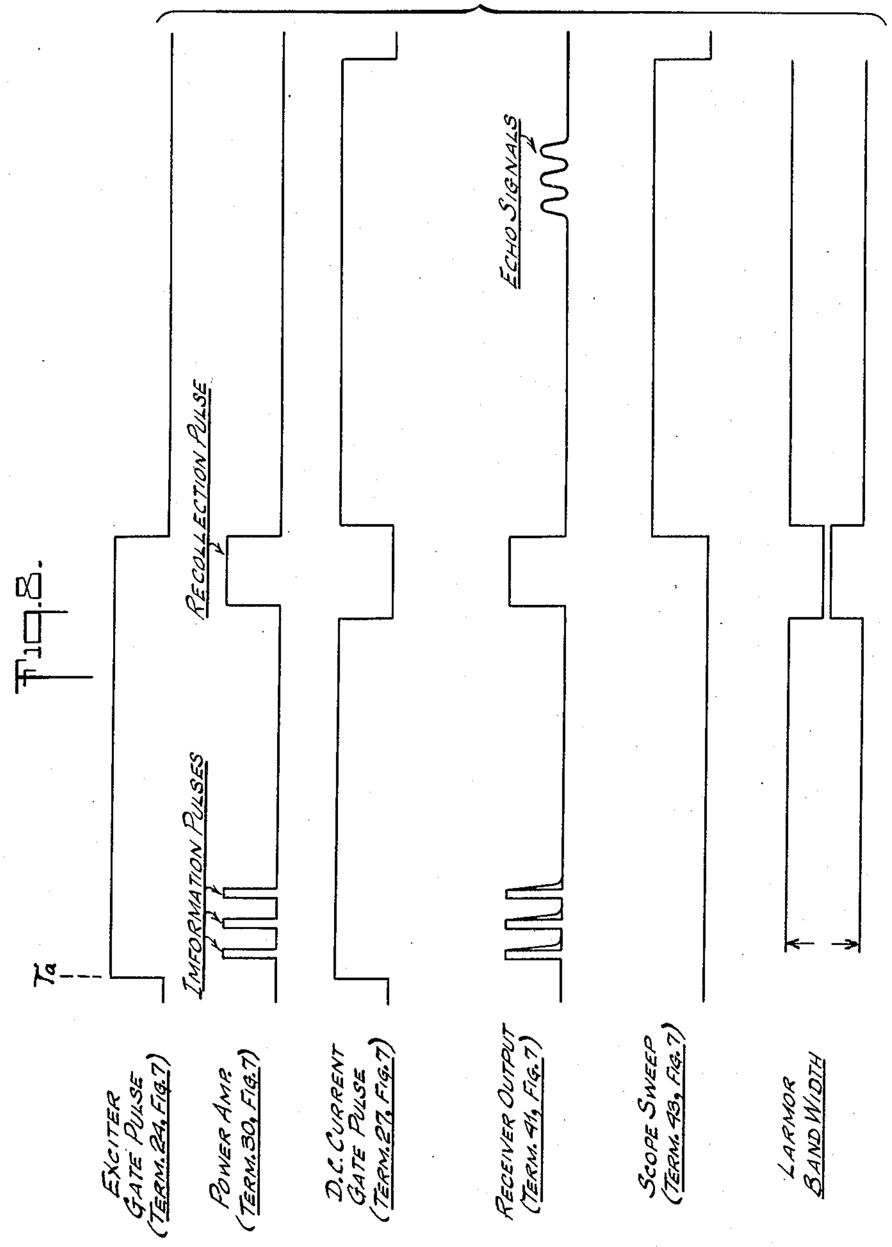

Figures 4A, 4B, and 4C are geometrical representations of composite nuclear moments during their subjection to a succession of informational input pulses;

Figure 5 is a linear diagram showing the time relation of multiple input pulses, the recollection pulse, and the emergence of the multiple read-out signals;

Figure 6A is a diagram illustrating the nature of the magnetic field portion produced by the D. C. coils;

Figure 6B is a similar diagram showing the composite field produced by the D. C. coils and the permanent magnet;

Figure 7 is an electrical diagram illustrating a typical combination and inter-connection of apparatus for practicing the invention, and Figure 8 is a parallel time diagram showing the related conditions of the various electrical processes and related effects comprising the improved cycle of the invention.

The prime method and apparatus of spin technique defining the state of the art prior to the present invention are set forth at length in a paper entitled "Spin Echoes" by E. L. Hahn, published in The Physical Review, vol. 80, No. 4, 580–594, on November 15, 1950. Since, as stated, the general concept of the spin echo system and the previously discovered physical phenomena on which it is based are explained in voluminous mathematical detail in the above-mentioned publication, they need be recapitulated herein only in sufficient detail to define clearly the advance in the art effected by the new and useful features of the present invention.

It has been determined that in the majority of substances two characteristics of the atomic nuclei are spin and magnetic moment. Since each nucleus has mass, however tiny, its spin entails angular momentum so that the nucleus acts as a small gyroscope. At the same time, since the nucleus is composed of one or more charged particles or protons, the spinning motion of these particles gives rise to electrical effects which impart a characteristic magnetic moment to the nucleus as a whole. For a given nucleus, that is the nucleus of a given substance, there exists a specific ratio between the magnitudes of the magnetic moment and the gyroscopic moment, this ratio being termed the gyromagnetic ratio and hereinafter designated by the letter $\gamma$. A detailed discussion of the derivation and determination of gyromagnetic ratios is contained in the specification of Patent Number 2,561,489 to Bloch et al., which patent deals with such determination per se in a process utilizing nuclear induction, though in a manner not involving nor suggesting the spin echo technique.

The magnetic moment of a given nucleus, due to the rotation of the charged particles therein as noted above, may be visualized as a microscopic bar magnet comprising the axis of rotation of the nuclear gyroscope. Thus the microscopic moment may be represented by a single vector $M_n$.

When a nucleus is subjected to a constant magnetic field $H_o$ and the nuclear system is in thermal equilibrium, the nuclear moment $M_n$ is aligned either with or against the magnetic field $H_o$, after the manner of an ordinary gyroscope with its axis aligned in the direction of the gravitational field. If the nuclear system is not in thermal equilibrium, that is, if $M_n$ is tilted away from the direction of the field $H_o$, the nuclear moment $M_n$ is subjected to a torque caused by the interaction of the external magnetic field $H_o$ and the nuclear magnetic moment itself, the torque being proportional to the magnitude of $H_o$. This torque causes the nuclear moment $M_n$ to steadily change direction while maintaining (for a short period of time) a substantially constant angle with the magnetic field $H_o$, thereby describing a cone about an axis parallel to the field $H_o$. This conical rotation is termed precession, being similar to the familiar motion of a gyroscope when the latter's axis is tilted away from the vertical direction.

The rate of gyroscopic precession in a given field $H_o$ is commonly termed the Larmor frequency, and is equal to $\gamma H_o$, where $\gamma$ is the gyromagnetic ratio of the nucleus as previously noted, that is the ratio of the magnetic moment to the gyroscopic moment. Thus, if several nuclei which are not in thermal equilibrium are acted upon by different strengths of $H_o$, their respective magnetic moments $M_n$ precess at different Larmor frequencies. As will hereinafter be shown, information can be stored in a substance such as water or light mineral oil, for example, by taking advantage of the different Larmor precessional frequencies of various nuclei therein produced by simultaneously subjecting them to differing values of $H_o$ throughout the sample.

The increase in energy of a nucleus which it can gain by aligning itself parallel to the external magnetic field $H_o$ is small in proportion to the energy of thermal agitation present in the chemical substance. Therefore, whether the microscopic moment $M_n$ is aligned with or against the field $H_o$ is determined largely by chance, and only slightly by the magnetic torque between $M_n$ and $H_o$. If, for example, it is assumed that there are 1,000,150 nuclear moments present in the field $H_o$, it is possible that 500,150 are aligned with the field and 500,000 are aligned against it. When these 1,000,150 nuclear moments are contained in an incremental volume which is subjected to a uniform value of $H_o$, they will all precess at the same Larmor frequency. Hence, the 500,000 moments aligned against the field cancel an equal number of those aligned with it, so that only the resultant moment need be considered.

This resultant moment M, which pertains to an incremental volume, is a microscopic concept representing the vectorial summation of the nuclear moments $M_n$ of the individual nuclei contained in that particular incremental volume. Accordingly if the nuclei of the volume are out of thermal equilibrium so as to be subject to a magnetic torque, the resultant moment M will precess at a Larmor frequency dependent on the value of the magnetic field $H_o$, as previously set forth for the case of the single nuclear moment $M_n$.

When an incremental volume of substance has been located in a strong uniform or homogeneous magnetic field $H_o$ for a sufficient period of time so as to be in thermal equilibrium, the moment M is aligned in or against the direction of the field, in the manner in which the axis of a displaced gyroscope gradually returns to vertical alignment under the influence of damping. If an R. F. field $H_1$ having a frequency $f_1$ equal to the Larmor frequency $f_o$ is now applied to the substance at right angles to the field $H_o$, a torque is applied to the moment M which causes it to be turned away from the direction of $H_o$. The angle of tipping $\theta$, that is the angle between the moment M and the direction of $H_o$, is proportional to the magnitude of the field $H_1$ ($f_1=f_o$) and the time during which the R. F. field $H_1$ exists. This relationship is expressed by the following equation:

$$\theta=\gamma H_1 t_w \qquad (1)$$

where $\theta$ is in radians, $H_1$ is one-half the R. F. field strength in gauss, and $t_w$ is the time duration of the $H_1$ field in seconds. For the typical example of protons (hydrogen nuclei), $\gamma=2.68\times10^4$.

The choice of $\gamma$ for hydrogen nuclei as illustrative of the quantitative relationships involved in Spin Echo technique is due to the determined fact that in the practical application of the technique, particularly at high speeds, the hydrogen nuclei of the substance are the active element, being much more readily responsive to the magnetic influences of the process within the frequency range employed than are the heavier and more complex nuclei of other elements present. In other words, in the practical time and energy range employed to excite the hydrogen nuclei, the nuclei of the other elements while influenced in the same manner, are so affected to such a relatively small degree that their quantitative effect on the process is negligible, i. e., they may be considered as present but playing no significant part in the procedure. In view of this fact, it is evident why the technique is advantageously applied to certain substances rich in hydrogen, such as water or light mineral oils, as previously noted, though by no means limited thereto.

The nuclear activity within a comparatively large sample volume of a chemical substance can be analyzed by consideration of the time and space relationships of a pair of moments M and $M^1$ which represent a pair of incremental volumes mediately located in the sample, in other words, by determining the relative behavior of different co-existent moments on which the phenomenon of spin-echo is based.

Figure 1:
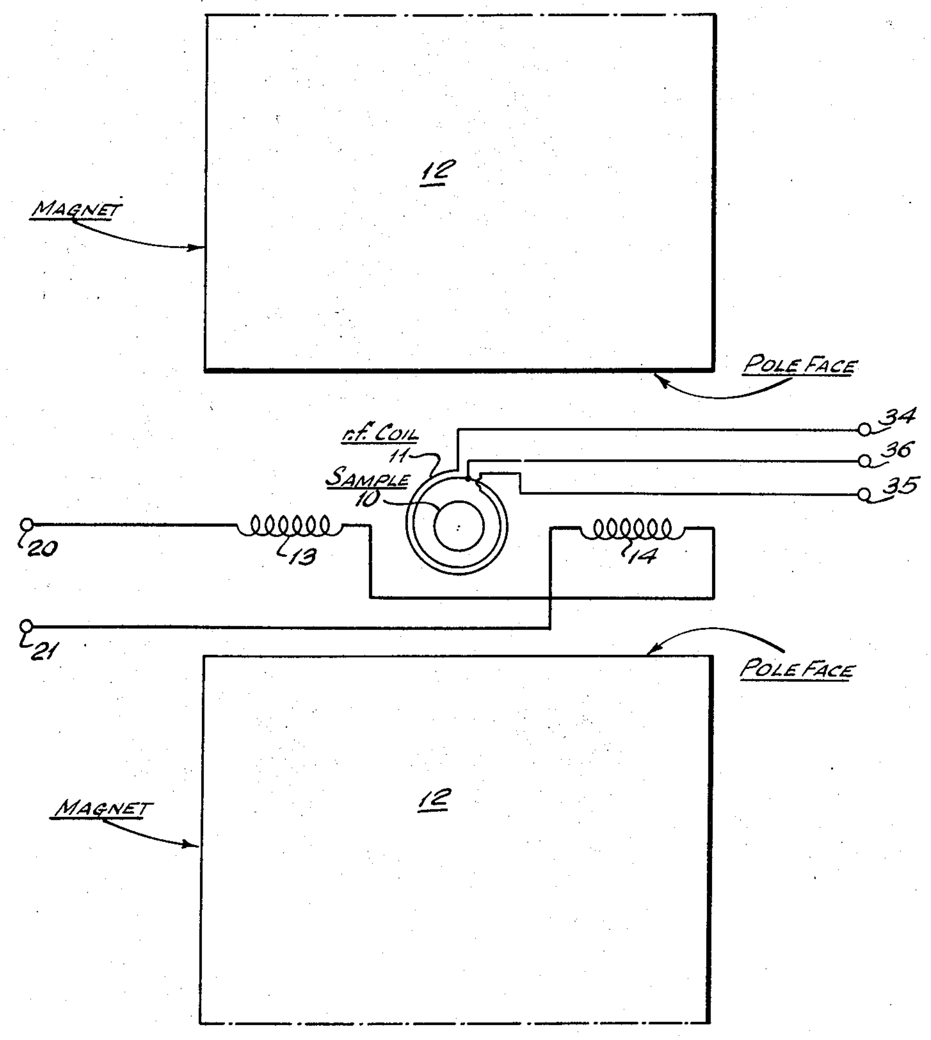

Referring to Figure 1, the numeral 10 designates a sample of chemical substance, for example water or mineral oil, in which information is to be stored. The sample 10 is disposed between the pole faces of a magnet 12, preferably of the permanent horse-shoe type. The field $H_o$ exists in the vertical direction, while a radio-frequency coil 11 is arranged to supply a field with its axis into or out of the paper of the diagram, the R. F. field thus being perpendicular to the $H_o$ field.

A pair of direct current coils 13 and 14, arranged as shown diagrammatically with respect to the magnet 12 and R. F. coil 11, is provided for a purpose which will be hereinafter explained in setting forth the improved technique of the present invention.

The $H_o$ field supplied by the magnet 12 is not perfectly uniform or homogeneous throughout the gap between the pole faces, the inhomogeneity being determined by the particular composition and physical construction of the magnet, together with the technique used in magnetizing it. Therefore portions of the sample 10 are subjected to strengths of $H_o$ slightly greater than the average affecting the sample as a whole, while other portions are subjected to values of $H_o$ slightly less than the average. Thus, over a cross-section of the sample 10 there exists a spectrum of $H_o$ values ranging from $H_o$ maximum to $H_o$ minimum. This spectrum may be referred to as $\Delta H_o$, where $\Delta H_o = H_o$ max. $- H_o$ min. Under these conditions, if the various moments (M) throughout the sample 10 are caused to precess, they will precess at slightly differing Larmor frequencies, since as previously pointed out, the Larmor frequency for any given moment is directly dependent on the particular field strength affecting it.

In considering the manner in which spin-echoes are produced, the simplest case will first be taken up, in which a single electrical pulse of information is to be stored in and subsequently extracted from the sample 10. As previously noted, the method can be explained by considering two typical moment vectors M and $M^1$ representing two incremental volumes mediately located in the volume of the sample. For purposes of analysis, two moments are chosen which are both aligned in the direction of the magnetic field $H_o$ when the system is in thermal equilibrium.

Figure 2:
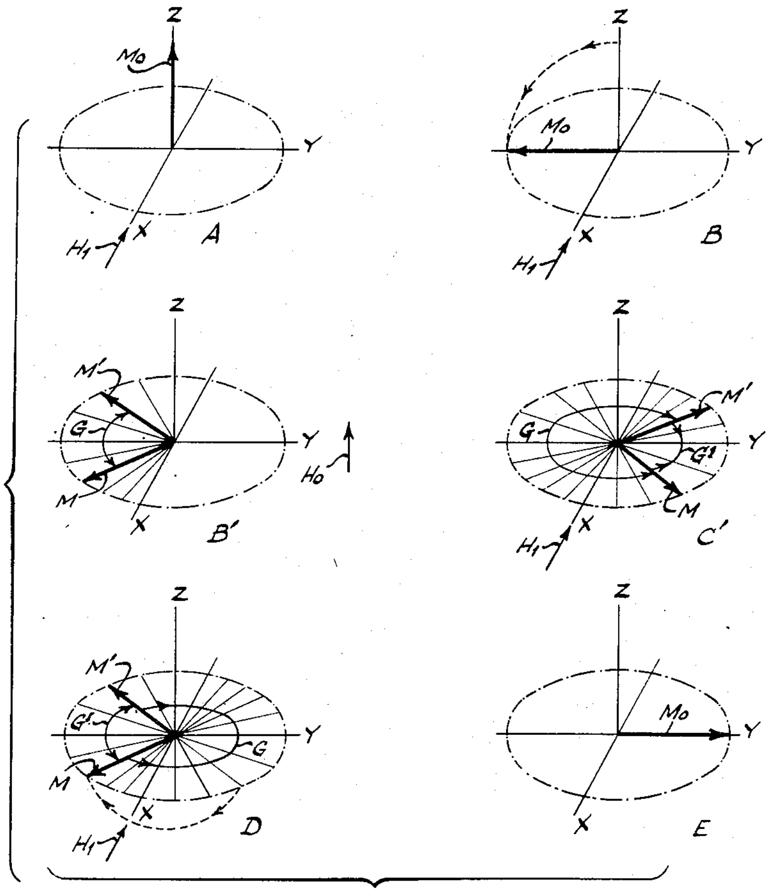
Figure 2 is a geometrical group diagram containing related sub-figures A, B, $B^1$, $C^1$, D and E illustrative of related composite nuclear moment positions at successive periods throughout an operational cycle.

Referring to geometrical Figure 2A, the vertical or Z direction represents the direction of the magnetic field $H_o$. The system being in thermal equilibrium, as stated, a composite moment $M_o$ is aligned in the Z direction, this moment $M_o$ comprising for the time being the pair of moments M and $M^1$ previously referred to as representing two incremental volumes. If a magnetic torque is now applied to the moment $M_o$, the latter will be tipped away from the vertical or Z axis. To set up the torque, a R. F. field $H_1$ is generated by means of the R. F. coil 11, Fig. 1, this field existing in the XY plane of Fig. 2 and providing a rotating field effect similar to that of a single-phase induction motor.

The frequency of the R. F. field must be substantially the average Larmor precession frequency $f_o$ of the chemical sample under observation. For example, for $H_o$ value 7000 gausses, $f_o$ is approximately 30 megacycles.

For analysis it is convenient to consider the XY plane as rotating in synchronism with the R. F. field $H_1$, i. e., at the average Larmor frequency $f_o$ of the sample. Thus if a given vector is rotating at frequency $f_o$, it appears stationary with respect to the XY plane over a period of time. However, if a vector is rotating faster or slower than $f_o$, it appears to move forwardly or rearwardly with respect to an imaginary radial line in the rotating XY plane.

Referring again to Fig. 2A, the field $H_1$ in the form of a single R. F. pulse, termed the information pulse, is applied to the moment $M_o$, causing the latter to be tilted away from the Z axis as previously noted. Also as previously noted in Equation 1, the angle of tipping $\theta$ is proportional to strength of $H_1$. For any angle of tipping, the components of $M_o$ existing in the XY plane contribute to the production of the "echo" signal, as hereinafter explained. Since the XY components of $M_o$ are maximum, in fact equal $M_o$, at a tipping angle of 90°, the echo signal is of maximum amplitude when this 90° tipping is employed. While as will later be set forth, useful results are obtained by the use of lesser angles, for purposes of simplicity in analysis of the simplest case under consideration, the angle 90° is first applied herein.

Figure 3:
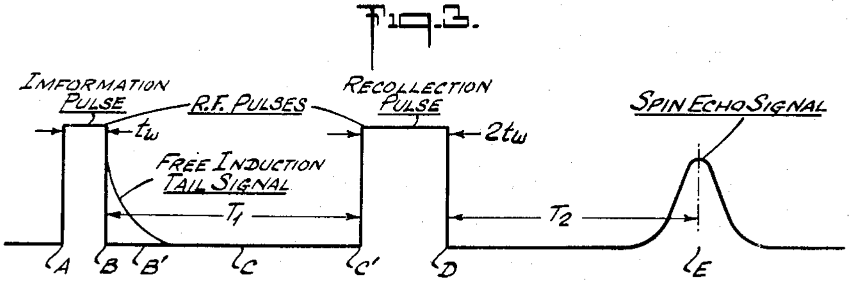
Figure 3 is a linear diagram illustrating the time relationship of successive operations throughout the cycle in correspondence with the postional sub-figures of Figure 2.

Referring to Fig. 3, associated with Fig. 2, the information pulse of duration $t_w$ is shown at the left, this width of pulse being chosen to make angle $\theta=90°$ as noted above.

At the completion of the information pulse (time B in Fig. 3) the moment $M_o$ will be located in the XY plane as shown in Fig. 2B. Since $M_o$ is no longer in thermal equilibrium and is consequently acted upon by the field $H_o$, its components begin to precess.

Since the components M and $M^1$ are acted upon by different values of $H_o$, due to the inhomogeneity spectrum of the permanent magnet 12 and their mediate location in the sample, M and $M^1$ precess at different Larmor frequencies. Consider that the locations of the incremental volumes represented by M and $M^1$ are such that $M^1$ undergoes a value of $H_o$ greater than the average while M experiences a value less than the average $H_o$ applied to the sample. In this case $M^1$ precesses at a Larmor frequency greater than $f_o$, while M precesses at a frequency less than $f_o$. Therefore, a short time after the cessation of the information pulse, M and $M_1$ are rotating in opposite directions with respect to the rotating XY plane, that is, in effect drawing apart as illustrated in Fig. $2B^1$. The positions of M and $M^1$ as shown in Fig. $2B^1$ correspond to the time $B^1$ in Fig. 3.

Since at the time B, Fig. 3, at which the information pulse ceases, moments M and $M^1$ are together or in constructive interference, a "free induction tail signal" at the trailing edge of the information pulse is induced in the R. F. coil 11 of Fig. 1. This signal dies out as M and $M^1$ precess sufficiently out of phase with each other as virtually to cancel.

The moments M and $M^1$ continue moving in opposite directions relative to the XY plane while the latter makes a plurality of revolutions, until at the end of time $T_1$ after the cessation of the information pulse they may be considered as located in the positions shown in Fig. $2C^1$.

A second R. F. pulse, termed the recollection pulse, is now applied, causing the moments M and $M^1$ to be displaced or rotated away from the XY plane. If the duration of the recollection pulse $C^1D$ (Fig. 3) is twice as long as the information pulse AB, the moments M and $M^1$ are rotated through an angle $\theta=180$ degrees. In effect the XY plane is rotated 180 degrees about the X axis into "mirror" position as shown in Figure 2D. In other words, the "pancake" containing the XY plane is flipped over by the recollection pulse. The positions of the moments shown in Figures $2C^1$ and 2D correspond respectively to times $C^1$ and D, Fig. 3. While it is not strictly necessary that the recollection pulse produce a rotation of 180°, this angular rotation is known to be preferable in a Spin Echo storage system. This is obviously true since it retains M and $M^1$ in the XY plane and thus produces the maximum echo induction in the R. F. coil at a later time. It will be noted respecting Figs. $2C^1$ and 2D that the 180° rotation of the XY plane does not appreciably disturb the angular spacing but inverts the phase relationship between the moments present.

Prior to the onset of the recollection pulse, the moment vector M was revolving counter-clockwise relative to the XY plane's average rotation, while $M_1$ was revolving clockwise relative thereto, as indicated respecting Fig. $2C^1$. Thus, during the time $T_1$ following the cessation of the induction signal (Fig. 3) the vectors M and $M^1$ have swung around in the XY plane through a combined angle G and are approaching each other, being separated only by the decreasing angle $G^1$, where $G^1=360°-G$. Following the recollection pulse, which has thrown the vectors into the mirror position of Fig. 2D as noted, the vectors M and $M^1$ are still separated by the angle $G^1$, but as their rotational directions remain respectively counter-clockwise and clockwise, the angle $G^1$ becomes increasing and the angle G decreasing. Since the relative speeds of precession remain the same as before the reversal, if a time $T_2$ is allowed to elapse equal to the time $T_1$ (Fig. 3), the moments M and $M^1$ will jointly re-traverse the angle G and come into phase coincidence as indicated in Fig. 2E. As M and $M^1$ approach phase coincidence a mutual re-enforcement begins to occur which induces a signal in the R. F. coil (Fig. 1) surrounding the sample. This induced signal, called a Spin Echo signal, is illustrated at E in Fig. 3. The induced signal assumes a wave shape which grows and dies out symmetrically as the moments move into and out of phase.

To summarize the simple case briefly, the described echo signal was the result of first orientating the active moments contained within the sample to the position shown in Fig. 2B, allowing them to precess at their individual Larmor frequencies so as to change their mutual phase relationships, applying the recollection pulse to reverse the directions of the changing phase relationships, and allowing the moments to retrace their previous movements back to reinforcing coincidence.

During the time between the information pulse and the recollection pulse the phase relationships among the moments are such that an effective re-enforcement cannot occur.

It will obviously be understood that while the foregoing discussion traced the typical movements of a pair of moments M and $M^1$, the echo signal is due not to any single pair of moments but to a very large number of them in coincidence.

The foregoing analysis must be extended where a plurality of information pulses is to be stored in the sample. Referring to Fig. 4A, the vector $M_o$ again represents the vector sum of all effective moments in the sample at thermal equilibrium. The vector $M_o$ has an amplitude extending to point 17 on the Z axis. A first information pulse $P_1$ (Fig. 5) is applied, which causes $M_o$ to be tilted through an angle $\theta$ away from the Z axis, as shown in Fig. 4B. In Fig. 4B the vector $M_o$ can be considered to be composed of the component $M_{oa}$ with an amplitude (less than the amplitude 17) extending to point 16 on the Z axis, and the component $M_{ob}$ located in the XY plane. Recalling that the vector $M_o$ is composed of all the vectors representing incremental volumes of the sample, the components of these incremental moment vectors present in $M_{ob}$ begin precessing in the XY plane and have certain changing phase relationships with each other.

The application of the second information pulse $P_2$ (Fig. 5) causes the vector $M_{oa}$ of Fig. 4B to be tilted away from the Z axis as shown in Fig. 4C. The tilted vector $M_{oa}$ is comprised of components $M_{oc}$ of amplitude 15 and $M_{od}$ located along the Z and Y axes respectively. The radial vectors shown in the XY plane which are unmarked in Fig. 4C represent the components (or vertical projections thereof) of $M_{ob}$ which are precessing at their individual Larmor frequencies. Now the components of $M_{od}$ will also begin precessing in the XY plane. While it is obviously difficult to show pictorially the true situation existing in the XY plane, it will be appreciated that there are now two families of moments precessing in the XY plane; one family derived from $M_{ob}$ of Fig. 4B and one derived from $M_{od}$ of Fig. 4C.

By applying a third R. F. information pulse $P_3$ (Fig. 5), the vector $M_{oc}$ of Fig. *4c* is tilted away from the Z axis as was $M_{oa}$ for the second pulse $P_2$. This action adds a third family of vectors precessing in the XY plane. Similarly, if further information pulses are applied to the sample, the component of the resultant vector existing in each case along the Z axis will be tilted away therefrom, adding further families of vectors to those in the XY plane. It will be seen that the practical limit to the number of pulses which can be stored in a sample is dependent on the available magnitude of the component of the resultant vector existing along the Z axis.

The mathematical analysis of the above phenomenon is fully set forth in the publication in Physical Review previously referred to; for purposes of simplicity in the present recapitulation, it is useful to consider briefly the physical conditions existing in the sample as a whole as it is subjected to successive information pulses. It is thus necessary to consider that due to complex internal conditions such as inter-nuclear and inter-molecular "shielding," the comparatively large extent of the sample, and inhomogeneity of the R. F. field itself, the potentially active gyromagnetic nuclei of the sample are not equally subjected to the onslaught of an R. F. pulse. Consequently, as a short pulse is applied, some of the gyromagnetic moments are tipped appreciably from the Z-axis direction in varying degree to form a first effective inductional resultant or family of moments subject to differential precession, but others are left so little affected as to remain in effect substantially orientated together in the Z direction. The onset of the second information pulse in turn attacks and tips additional ones of these remaining in-phase moments to form a second family of moments whose differential precession starts at completion of the second pulse, but again leaving a residue of substantially in-phase moments awaiting the next information pulse. Thus the vertical vectorial components such as $M_{oa}$ and $M_{oc}$, Figs. 4B and 4C, may properly be regarded in each case as representing a measure of the remaining available in-phase nuclear moments, rather than merely vertical components of previously displaced and hence already diagonally directed moments. The foregoing method of consideration, necessarily oversimplified with regard to the composite effects taking place, serves to indicate why successive information pulses result in separate resultant constructive interference signals, rather than in mere increase in amplitude of a single signal.

The application of the recollection pulse $P_r$ (Fig. 5) will, in effect, cause the XY plane to be turned over, i. e., rotated 180 degrees as previously explained. At the end of time $T_3$ (Fig. 5) after the termination of the recollection pulse $P_r$, the family of vectors originally associated with information pulse $P_3$ will be in phase and will induce signal $S_3$ in the R. F. coil 11. Similarly, at the end of time $T_2$ after $P_r$ the family of vectors associated with $P_2$ will induce the signal $S_2$ in the R. F. coil; and at the end of time $T_1$ after $P_r$, the signal $S_1$ (corresponding to $P_1$) will be induced in the coil. Thus a series of echo signals appear in reverse order from that in which the corresponding information pulses were stored in the sample.

The system described above has been projected for a variety of purposes such as qualitative and quantitative chemical analysis, measuring the self-diffusion coefficients of molecules, measuring the rate at which nuclear moments lose Larmor precessional phase coherence, detecting the presence of paramagnetic substances, providing means for accurate measurement of magnetic fields, detecting whether a plurality of nuclear moments, either the same or differing, are located closely or remotely in a molecule, tracing the course of certain reactions involving bivalent elements which are paramagnetic in one valence and diamagnetic in the other, etc.

The foregoing discussion has reviewed in general the spin echo system as hitherto practiced. In order to make clear the new and useful improvements provided by the present invention, it is necessary to explain certain limitations of the described prior practice, which limitations are as follows:

In the spin echo system of storing information in a sample of a chemical substance, a prime factor of usefulness obviously lies in the resemblance between the echo signals and their corresponding information pulses. In such a system the shape of the echo signal is dependent on the spectrum of Larmor frequencies present in the family of precessing moments associated therewith. In order approximately to reproduce the shape of the information pulse the available bandwidth of the Larmor frequencies excited must be large compared to the bandwidth of the information pulses. This requires that $$\gamma \Delta H_{oi} > \frac{2\pi}{t_1} \qquad (2)$$

where $\Delta H_{oi} = H_o$ max. $- H_o$ min. (across the sample during storage of information) and $t_1$ is the time duration of the information pulse.

If it is desired to store 1 microsecond impulses in water, for example, the above relationship stipulates that $\Delta H_{oi}$ be approximately 235 gausses.

It was previously noted that the optimum value of the tilt angle $\theta$ caused by the information pulse is 90 degrees. It was also pointed out that where a plurality of pulses is stored the angle $\theta$ must be considerably less than 90 degrees or $$\frac{\pi}{2}$$

radians. Thus, when $n$ is the number of information pulses stored the following relationship is established:

$$n\gamma H_1 t_1 \leq \frac{\pi}{2} \qquad (3)$$

A single relationship concerning the information pulses can be obtained by combining Equations 2 and 3 to produce:

$$2H_1 < \frac{\Delta H_{oi}}{2n} \qquad (4)$$

Thus, since $H_1$ represents one-half the R. F. field strength as previously noted, Equation 4 states that the total R. F. field strength must be less than the total magnetic field inhomogeneity divided by twice the number of impulses stored.

This requirement is one of the limiting conditions imposed on the spin echo storage system.

With respect to the recollection pulse, a pair of equations similar to 2 and 3 can be written. The first must state that the Fourier bandwidth of the recollection pulse must be much greater than the bandwidth of the Larmor frequencies present in the sample. This is necessary in order to excite all the moments of the sample uniformly so that they may all be rotated through the same angle. Thus, where $t_r$ is the time duration of the recollection pulse and $\Delta H_{or}$ is the $\Delta H_o$ across the sample during this time, $$\frac{2\pi}{t_r} \gg \gamma \Delta H_{or} \qquad (5)$$

The second equation must state the conditions necessary to produce the 180 degree rotation referred to hereinbefore. Accordingly, $$\gamma H_1 t_r = \pi \qquad (6)$$

By eliminating $t_r$ from Equations 5 and 6 the limiting conditions imposed on the spin echo storage system become:

$$2H_1 \gg \Delta H_{or} \qquad (7)$$

Equations 4 and 7 define the limtations of the spin echo storage system where the same R. F. field strength is used during the information and recollection pulses. In the storage system previously described with respect to Fig. 1 (in which description the D. C. magnets 13 and 14 played no part, not being present in the prior practice under discussion, the $\Delta H_o$ existing during the information and recollection pulses is the same, since it is due to the inhomogeneity of the permanent magnet 12. Consequently, if $\Delta H_o$ must be approximately 235 gauss when 1 microsecond impulses are to be stored, the R. F. field ($2H_1$) must be large compared to 235 gauss, i. e., at least 500 gauss. To produce this 500 gauss field, it is estimated that almost a million watts of R. F. power would be required. The practical disadvantages of a system having any such huge R. F. power requirements are obvious.

The present invention eliminates the above disadvantages in the following manner:

An examination of Equations 4 and 7 indicates that if the $\Delta H_o$ utilized during the information pulses can be made many times larger than the $\Delta H_o$ present during the recollection pulse without destroying the phase memory of the sample, the requirements placed on the R. F. field will be less stringent.

The span of frequencies provided in each applied R. F. impulse is inversely proportional to the duration of the pulse. As indicated in Equation 2, for satisfactory reception of an information pulse, the sample must provide a Larmor frequency range substantially greater than the frequency range of the pulse, in order to take up all the latter's frequencies. On the other hand, as indicated with respect to Equation 5, the recollection pulse must provide a frequency bandwidth much greater than the Larmor bandwidth of the sample, in order to ensure picking up all of the latter's significant frequencies in rotating the nuclear moments through 180 degrees. It follows from the above noted inverse relationship that if the Larmor bandwidth were to remain the same for information and recollection pulses, the relatively wide frequency range of the recollection pulse would entail a relatively short time duration thereof, with the attendant excessive R. F. power requirement previously set forth. However, contraction of the Larmor bandwidth will allow corresponding reduction of the recollection pulse frequency bandwidth and consequently, by the inverse relation, a longer recollection pulse duration with accompanying reduced R. F. power requirement.

In view of the above it is apparent that the ideal situation occurs in a Spin Echo system when $\Delta H_{or}$ of Equation 7 is zero or at least is very small compared to $\triangle H_{oi}$ of Equation 4. Where the magnetic field $H_o$ is furnished by a large permanent magnet, it is obviously difficult to decrease $\triangle H_o$ below the normal inhomogeneity of the magnet. Thus, a practical solution of the problem is to provide a greatly augmented $\triangle H_o$ at all times except when the recollection pulse is present; during this latter time $\triangle H_o$ is that due solely to the magnet itself.

The effect of the presence of $\triangle H_o$ of the magnet alone during the recollection pulse and the utilization of a larger $\triangle H_o$ throughout the remaining time is to provide a large bandwidth of Larmor frequencies during the storage of information and to compress the spectrum of Larmor frequencies excited into a narrow bandwidth for the duration of the recollection pulse, as illustrated in Fig. 8. The reduced Larmor bandwidth during the recollection pulse permits this pulse to be of greater duration and less amplitude without appreciable change in angular or phase relationships as noted above. Stated in another way, during the recollection pulse the Larmor frequencies of the various moments in the sample are changed to encompass a narrow range of frequencies whereby smaller torque and hence smaller R. F. power are required to produce the 180 degree rotation desired. After the recollection pulse the moments are returned to their original Larmor frequencies, i. e., to the broader spectrum which will more accurately reproduce the shape of the information pulse when the in-phase condition occurs and the echo signal is induced in the R. F. coil.

In a practical embodiment of the present invention the augmented $\triangle H_{oi}$ is provided by introducing a second magnetic field between the pole faces of the permanent magnet, which distorts the field $H_o$ due to the magnet. The distortion of the field $H_o$ is such that portions of it are reinforced (the fields add and thus $H_o$ maximum is increased), while other parts are weakened (fields subtract and $H_o$ minimum is lower), producing a wide spectrum of local strength differences, though the average field strength remains substantially constant.

To produce the above effect, referred to Fig. 1, the coils 13 and 14 are connected in series opposing between terminals 20 and 21. By passing a direct current through coils 13 and 14 a distorted field pattern is established as illustrated in Figs. 6A and 6B. Fig. 6A is illustrative of the path of lines of force which would be produced by the coils 13 and 14 alone, that is if the poles of 12 were considered as previously unmagnetized so as to produce no field $H_o$ of their own. Fig. 6B illustrates the actual total field comprising the combined fields produced by the previously magnetized 12 and the coils 13 and 14. It is obvious that the distorted field of Fig. 6B produces a far greater spread in field strengths ($\triangle H_o$) in the sample 10 than that of the relatively homogeneous field of magnet 12 acting alone. Thus by energizing and de-energizing the D. C. coils 13 and 14 the spectrum of coincident field strengths may be respectively widened and narrowed to produce the expanded and compressed Larmor frequency bandwidth previously set forth.

A typical arrangement of apparatus for practicing the improved Spin Echo system of the present invention is illustrated in semi-block diagram Fig. 7. Inasmuch as the internal structures and modes of operation of the labelled individual block components are well known in the electronic field, description thereof is appropriately limited to that necessary to explain the manner in which they play their parts in carrying out the invention.

Referring to Fig. 7, the synchronizer or pulse generator 23 originates the information and recollection pulses and other control pulses required by the system. The wave-forms due to the synchronizer 23 are illustrated in Fig. 8. In the following description, in correspondence with the diagrammatic depiction of the wave forms, it is convenient to speak of the energized condition as Up and the de-energized (or relatively de-energized) condition as Down. At time $T_a$ in Fig. 8 terminal 24 goes Up, thereby delivering an input to the R. F. exciter 25, Fig. 7. The exciter unit 25 comprises an oscillator and a plurality of frequency doubling stages, serving as a driving unit for the R. F. power amplifier 26.

Also at time $T_a$ the terminal 27 of the synchronizer 23 is Up (Fig. 8) so as to drive the D. C. current source 28 of Fig. 7 into operation. The current source 28 comprises a plurality of electron tubes in parallel connected in a well-known manner such that when fully conducting they cause a direct current to flow through coils 13 and 14; conversely, when terminal 27 is Down the current source 28 is inoperative so that no current flows through 13 and 14.

Several microseconds after $T_a$ in Fig. 8, the first information pulse appears on terminal 30 of Fig. 7. The signal present on terminal 30 is delivered to the R. F. power amplifier 26 and therein employed to cause the amplifier to produce an R. F. output pulse. Thus, in order for the power amplifier to produce an output signal it must be receiving an R. F. driving signal from the exciter unit 25 and the terminal 30 must be Up, i. e., the pulse signal on terminal 30 "keys" the power amplifier. In Fig. 8 it will be noted that the signal on terminal 24 is present slightly before the first information pulse, in order to permit the oscillator in exciter 25 to achieve its fully oscillating condition before the power amplifier is operated.

Following the appearance of the first information pulse the remaining information pulses appear serially on terminal 30, while at a later time the recollection pulse appears thereon, all as illustrated in Fig. 8.

The output of the power amplifier 26, Fig. 7, is connected to a tuning network 31 which matches the output impedance of 26 to that of a coil 32. The coil 32 is inductively coupled to a coil 33 which supplies energy to a bridge circuit whose input comprises terminals 34 and 35.

Also connected between terminals 34 and 35 are the two R. F. coils 11A and 11B (comprising together the R. F. coil 11, Fig. 1), whose center is connected to a terminal 36. The sample 10 in which information is to be stored is located in coil 11A as indicated. Capacitors 37A and 37B, connected in parallel with coils 11A and 11B respectively, serve to time these coils to resonance. The coil 11A and capacitor 37A form the first leg of the R. F. bridge circuit, while coil 11B and capacitor 37B form the second leg thereof.

A variable capacitor 38C and a variable resistor 39C are connected in parallel between ground and terminal 34 to form the third leg of the bridge circuit. The fourth leg of the bridge circuit comprises a variable capacitor 38D shunted by a resistor 39D and connected between ground and terminal 35. The bridge is balanced by adjusting the resistor 39C and capacitors 38C and 38D so that terminal 36 is at approximately ground potential.

The purpose of the described balanced bridge circuit is to permit the terminal 36 to be approximately at ground potential as noted when the R. F. field is applied to the sample 10. This prevents a large part of the signal produced by the power amplifier 26 from entering a video type receiver 40 to which terminal 36 is connected in input relation. Since little or no R. F. energy appears at terminal 36, the receiver 40 recovers rapidly after the cessation of the R. F. signal.

As previously noted, the echo signals are induced in the R. F. coil 11A when the revolving moments approach the in-phase condition. The echo signals appear on terminal 36 and are delivered as input to the video receiver 40 which amplifies and detects them. The output signals from the video receiver emerge on terminal 41 which is connected to the vertical amplifier of a cathode ray oscilloscope 42, the wave-form of these echo signals being illustrated in Fig. 8. The horizontal sweep pulses of the oscilloscope 42 are provided by the synchronizer 23 via a terminal 43. Fig. 8 also illustrates the duration of the horizontal sweep.

In Fig. 8 it will be noted that the pulse present on terminal 27 goes Down several microseconds before the onset of the recollection pulse and remains Down until several microseconds after the completion of the recollection pulse, thus removing the flow of D. C. current through the coils 13 and 14 throughout the intervening period. The effect of this action is to remove the large composite $\triangle H_{oi}$ so that only the small $\triangle H_{or}$, due to the inhomogeneity of the permanent magnet, is present during the information pulse. This reduction effects the desired compression of the Larmor frequency bandwidth, also illustrated in Fig. 8, thus permitting the practical storage of information pulses of one microsecond or less and the extraction of corresponding echoes while using only moderate amounts of R. F. power, as previously explained.

In referring to the cyclic sequence of the technique, the periods of time embracing the recollection pulses may appropriately be termed "control" periods. The process of contracting of the Larmor bandwidth during the control periods can in effect be considered as somewhat analogous to releasing the clutch of a motor truck while changing gears.

From the foregoing explanations it will be seen that the typical combination of apparatus illustrated in Figs. 1 and 7 provides effective means of practicing the improved Spin Echo technique of the present invention, but it will also be understood that various other combinations may be employed to the same end. For example, in a second practical embodiment the large $\Delta H_0$ is provided by employing a permanent magnet 12 having an unequal gap spacing across its width, i. e., the pole faces do not remain equidistant across the field embracing the sample. The large distortion inherent in such a magnetic field is reduced to a minimum during the recollection pulse by energizing the D. C. coils 13 and 14, which coils in this case are designed to correct the distortion so as to provide a nearly homogeneous composite field. Thus in operation of this embodiment the D. C. coils are de-energized during storage and echo and are energized during the recollection pulse instead of the reverse sequence illustrated in Fig. 8, but it will be evident that the accompanying other operations remain the same and the resultant selective compression and expansion of the Larmor bandwith occur in the same manner.

It will also be evident that other physical modifications may be employed, such as the use of a D. C. electromagnet instead of the permanent magnet 12. Similarly, variations in procedure within the practice of the technique may also be made. In other words, while the invention has been typically described and illustrated, it is not limited to the exact procedural or structural details set forth, as various modifications and variations obviously may be made without departing from the scope of the appended claims.

What is claimed is:

1. That method of storing information in a sample of chemical substance and subsequently extracting said information therefrom by spin echo which includes the steps of establishing a magnetic field having an initial strength inhomogeneity spectrum of substantial extent, subjecting said sample to said inhomogeneous field whereby gyromagnetic nuclei of said sample may be aligned therein, applying torsional magnetic information pulses to said sample to establish precession of the magnetic moments of said nuclei at initial Larmor frequencies differing through a bandwidth responsive to said field inhomogeneity throughout said sample, reducing said field inhomogeneity spectrum, applying a torsional magnetic recollection pulse to said sample while maintaining said reduced inhomogeneity spectrum whereby said Larmor frequency bandwidth may be compressed throughout the duration of said recollection pulse, re-establishing said initial field inhomogeneity spectrum whereby said nuclear moments may produce echo pulses correspondent to said information pulses by precession to constructive interference at said initial Larmor frequencies, and detecting said echo pulses.

2. That method of storing information in and recovering the same from a sample of material by free nuclear induction which includes the steps of magnetically preconditioning said sample for nuclear differential precession throughout an initial bandwidth of Larmor precessional frequencies, applying magnetic information pulses to said sample to establish said nuclear differential precession, magnetically compressing said Larmor bandwidth, applying a magnetic recollection pulse to said sample to initiate formation of inductive echo pulses, magnetically expanding said Larmor bandwidth whereby said echo pulses may be produced with an expanded differential precessional frequency range, and detecting said echo pulses.

3. Spin-echo technique for storing information in a sample of chemical substance and subsequently extracting said information therefrom which includes the steps of establishing a magnetic field of small strength inhomogeneity in a pre-determined region, establishing a second magnetic field additively and subtractively distorting said first field to form a composite field of relatively large strength inhomogeneity in said region, subjecting said sample to said composite field in said region, applying magnetic information pulses to said sample in said composite field, removing said distorting field to re-establish said undistorted first field in said region, applying a magnetic recollection pulse to said sample in said re-established first field to initiate subsequent formation of magnetically induced echo pulses correspondent to said information pulses, restoring said distorting field immediately following said recollection pulse whereby said echo pulses may be formed in said distorted composite field, and detecting said echo pulses.

4. In spin echo technique for information storage in and extraction from a chemical substance, said technique including an information pulse entering period, a recollection pulse period, and an echo pulse producing period, the steps of establishing a differential Larmor nuclear precessional bandwidth of substantial amplitude in said information entering period, compressing said Larmor bandwidth throughout said recollection pulse period, and re-establishing said initial bandwidth for said echo pulse producing period.

5. In spin echo technique for storing information in and subsequently extracting corresponding information from a sample of a chemical substance in a magnetic field, said technique including provision of information entering periods, control periods, and information extraction periods, the steps of establishing and maintaining a wide spectrum of strength inhomogeneity of said field throughout said entering periods, correcting said field to narrow said inhomogeneity spectrum throughout said control periods while maintaining the average strength of said field substantially constant, and restoring and maintaining said wide inhomogeneity spectrum of said field throughout said extraction periods.

6. In spin echo technique for storing information in and subsequent extraction of said information from a chemical substance by magnetically influencing gyromagnetic nuclei of said substance, said technique including provision of information entering periods, control periods, and information extraction periods, the steps of conditioning pluralities of said nuclei for precession at Larmor frequencies differing throughout a spectrum of substantial amplitude during said entering and extraction periods, and compressing said spectrum throughout said control periods.

7. Apparatus for storing information in and subsequently extracting said information from a sample of chemical substance by nuclear induction comprising, in combination, means to establish a polarizing magnetic field through said sample to polarize gyromagnetic nuclei thereof, said field having a normally fixed spectrum of strength inhomogeneity, electromagnetic means to distort said field for broadening said inhomogeneity spectrum, means to apply radio-frequency torsional magnetic information and recollection pulses to said gyromagnetic nuclei, timing means to initiate said information pulses during an information-entering period and to initiate a recollection pulse in a second subsequent time period, whereby said nuclei may form spin echo pulses by differential precession to constructive magnetic interference in a third time period following said second period, means controllable by said timing means to energize said electromagnetic means during said first and third periods and to de-energize the same during said second period, and means to detect said spin echo pulses.

8. The combination claimed in claim 7 wherein said first field-establishing means comprises a permanent magnet having substantially parallel pole faces, and wherein said electromagnetic distorting means includes a pair of axially spaced direct current coils having a common axis extending between said pole faces substantially at right angles to the direction of said first field, said coils being adapted when energized to establish simultaneous magnetic fields additive to and subtractive from said first field.

9. The combination claimed in claim 7 wherein said field field-establishing means comprises an electro-magnet adapted to be constantly energized, and wherein said electromagnetic distorting means includes a pair of axially spaced direct current coils having a common axis extending between them through said first field substantially at right angles to the direction thereof, said coil being adapted when energized to create simultaneous magnetic fields additive to and subtractive from said first field.

10. Apparatus for storing information in and subsequently extracting said information from a sample of chemical substance by nuclear induction comprising, in combination, means to establish a polarizing magnetic field through said sample to polarize gyromagnetic nuclei thereof, said field having a normally wide fixed spectrum of strength inhomogeneity, electromagnetic correcting means to compress said inhomogeneity spectrum, means to apply radio-frequency torsional magnetic information and recollection pulses to said gyromagnetic nuclei, timing means to initiate said information pulses during a first time period and to initiate a recollection pulse during a second time period whereby said nuclei may form spin echo pulses by differential precession to constructive magnetic interference in a third time period, means controllable by said timing means to energize said electromagnetic correcting means during said second time period, and means to detect said echo pulses.

11. The combination claimed in claim 10 wherein said first field-establishing means comprises a permanent magnet having a tapering gap betwen pole faces on opposite sides of said sample, whereby said first field established between said pole faces may normally have said wide spectrum of strength inhomogeneity, and wherein said electromagnetic correcting means includes a pair of coils adapted when energized to create simultaneous magnetic fields respectively additive to the weak side of said first field and subtractive from the strong side thereof.

12. In spin echo technique for information storage in and subsequent extraction from a substance containing gyromagnetic nuclei, said technique including provision of entering periods, control periods, and extraction periods, that method of providing a differential spectrum of Larmor precessional frequencies of said nuclei having a relatively wide bandwidth during said entering and extraction periods and a relatively narrow bandwidth during said control periods, which includes the steps of applying to said substance a magnetic field of relatively great strength inhomogeneity during said entering and extraction periods, and substantially correcting said inhomogeneity of said applied field throughout said control periods while maintaining the average strength of said field substantially constant.

13. That method of storing information in and subsequently extracting said information from a chemical substance by spin echo, which includes subjecting said sample to a distorted magnetic field, applying torsional magnetic information pulses to said sample to excite the magnetic moments of gyromagnetic nuclei therein to precession in phase-divergent relation, correcting the distortion of said field, magnetically influencing said nuclei in said corrected field to convert said phase divergence to phase convergence, re-establishing said initial distortion of said field whereby said nuclear moments may precess to convergence at the rate of said initial divergence to form magnetic echo pulses by constructive interference, and detecting said echo pulses.

14. That method of storing information in a sample of chemical substance and subsequently extracting said information therefrom which includes the steps of subjecting said sample to an inhomogeneous magnetic field to establish in-phase axial alignment of gyromagnetic nuclei in said sample, applying torsional magnetic information pulses of short duration to said sample to excite the magnetic moments of said nuclei to precession in phase divergent relation, applying a torsional magnetic recollection pulse of low intensity and relatively long duration to said nuclei to convert said phase divergence to phase convergence whereby subsequent echo pulses correspondent to said information pulses may be produced by constructive in-phase interference of said nuclear magnetic moments, reducing the differential frequency spectrum of said precession throughout said duration of said recollection pulse, and detecting said subsequently produced echo pulses.

15. In spin echo technique for storing information in and subsequently extracting said information from a sample of chemical substance, that method of conditioning gyromagnetic nuclei of said sample to produce an echo pulse closely correspondent to an information pulse previously entered therein which includes the steps of subjecting said sample to an inhomogeneous magnetic field to align the axial magnetic moments of said nuclei substantially in mutual in-phase relationship, applying a torsional magnetic impulse of short duration to said nuclei in said field to excite said axial magnetic moments to differential frequency precession in mutually phase-divergent relation, maintaining said precessional phase divergence throughout a pre-determined period to establish substantial quantitative angular phase differences among said moments, magnetically reducing the bandwidth of said differential frequency precession, applying a torsional magnetic recollection pulse of low intensity and relatively long duration to said nuclei to convert said mutual phase change from divergent to convergent relation while maintaining said reduced differential frequency bandwidth, and restoring said differential precessional bandwidth to its initial extent.

16. In spin echo technique for information storage in and recovery from a sample of chemical substance, the steps of magnetically aligning the axial moments of gyromagnetic nuclei of said substance in mutual in-phase relationship, magnetically establishing mutual informational phase divergent differential frequency precession among said moments, magnetically reducing the bandwith of said differential frequency precession, magnetically converting said phase-divergence to phase-convergence in said reduced bandwidth, and restoring said initial differential frequency bandwidth while retaining said phase-convergent relation among said precessing nuclear moments.

References Cited in the file of this patent

UNITED STATES PATENTS 1,533,390 Nyman -------------- Sept. 15, 1925